(No Model.)
R. PATTISON.
PNEUMATIC TIRE.
No. 573,997. Patented Dec. 29, 1896.
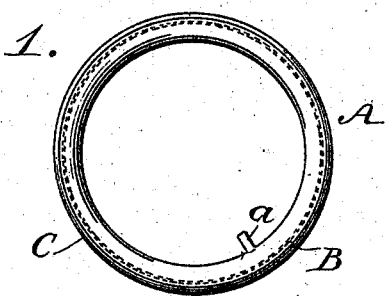
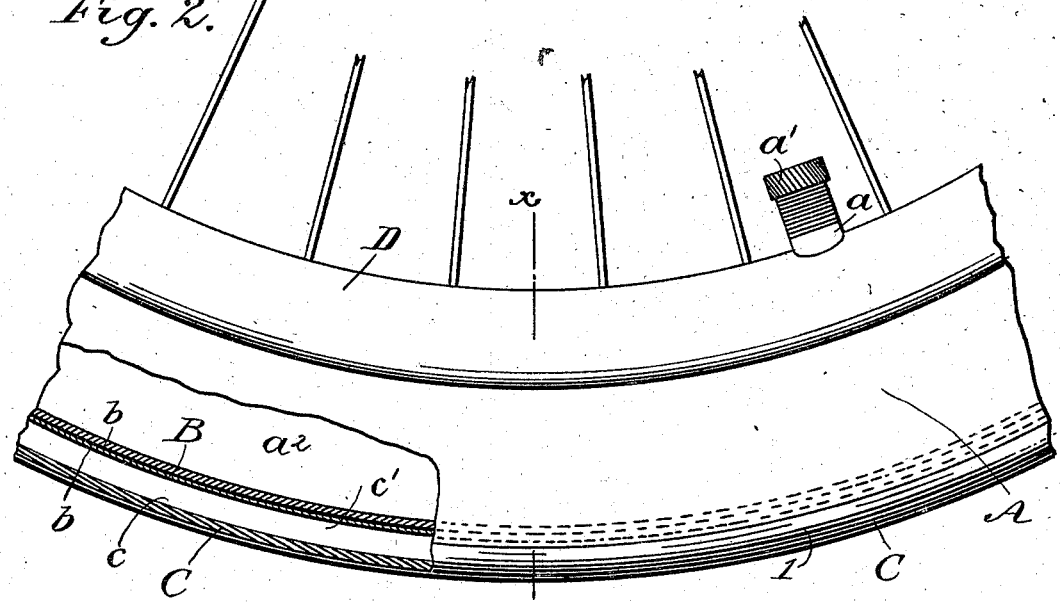
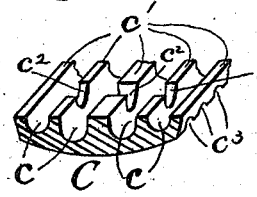
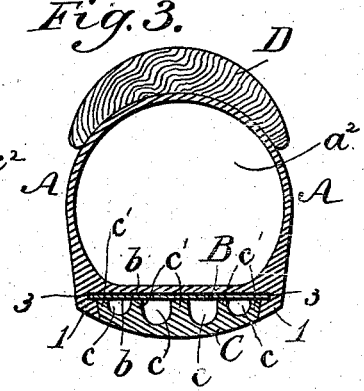
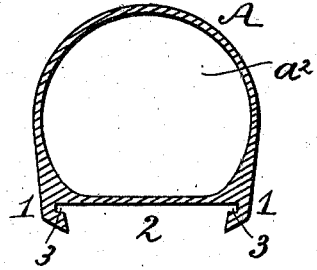
WITNESSES:
INVENTOR
Richard Pattison
BY
Clarr, Deemer & Co.
ATTORNEYS

UNITED STATES PATENT OFFICE.

RICHARD PATTISON, OF NEW YORK, N. Y., ASSIGNOR TO HIMSELF, PATRICK BROWMLEY, AND CHARLES A. DRUCKLIEB, OF SAME PLACE.

PNEUMATIC TIRE.

SPECIFICATION forming part of Letters Patent No. 573,997, dated December 29, 1896.

Application filed January 17, 1896. Serial No. 575,887. (No model.)

*To all whom it may concern:*

Be it known that I, RICHARD PATTISON, a citizen of the United States, and a resident of New York city, county of New York, and State of New York, have invented certain new and useful Improvements in Pneumatic Tires, of which the following is a specification, reference being had to the accompanying drawings, forming a part thereof, in which similar letters and numerals of reference indicate corresponding parts.

This invention relates to improvements in pneumatic tires for bicycle or other vehicle wheels, the object of the invention being to provide an article of this character which will be so constructed as to be practically nonpuncturable through the tread thereof to the pneumatic portion. The tire will be light in weight, inexpensive, and durable, and it will be susceptible of quick attachment to the rim of a bicycle or other wheel, and its tread can be repaired or renewed without in any way injuring or disturbing its pneumatic portion.

The invention will be hereinafter fully described, and specifically set forth in the annexed claim.

In the accompanying drawings, forming part of this specification, Figure 1 is a side elevation of my improved tire. Fig. 2 is a side elevation, partly broken away, of a portion of the tire, illustrated in full size and attached to the rim of a wheel. Fig. 3 is a cross-sectional elevation taken on a line $x$ $x$ of Fig. 2. Fig. 4 is a perspective view of a portion of the tread of the tire; and Fig. 5 is a cross-sectional elevation of the pneumatic portion of the tire, having its tread removed.

In the practice of my invention I construct a pneumatic tube A, of rubber or other flexible material, and form integrally therewith the ordinary tubular projection $a$, to which is secured any suitable feed-valve $a'$, through which air is adapted to be pumped into the annular chamber $a^2$ by a hand or other air-pump in the customary manner. The outer or tread portion 1 of the tube A is thickened and flattened upon its inner surface, but its outer surface is convex in cross-section. Into and around this said outer or tread portion is formed an annular dovetailed groove 2, and into the side walls of this groove annular grooves 3 are formed, whereby a substantially T-shaped groove is provided, which is adapted to receive and retain a metal ring B and a detachable tread C. Said tread C is composed of rubber or other flexible material, and it is dovetailed in cross-section, its side walls exactly registering with the inwardly-inclined side walls of the groove 2 of the tire A and its inner surface bearing upon the periphery of the metal ring B.

The ring B is preferably composed of spring-steel, but other material of sufficient resiliency and strength may be used. This said ring is incased in a covering $b$, of fabric, preferably cotton, in order to supply a surface adapted to take a coating of cement, which will be used to hold the parts together.

In order to lighten the tread C and also to increase its resiliency, it is provided with a series of annular grooves $c$, which form annular chambers and act as cushions when the parts are assembled and admit of very easy riding, but the walls $c'$ have sufficient strength to prevent the tread C from becoming useless should one of the grooves $c$ be punctured. To further lighten and increase the resiliency of said tread, one or more of the annular walls $c'$ may have formed therethrough notches or openings $c^2$. The tread may also be supplied upon its outer surface with cross grooves or corrugations $c^3$ to facilitate traction upon smooth or wet surfaces.

In assembling the parts the covered ring B and the grooved tread C are tightly cemented within the groove 2 and to each other, whereby a durable tire is produced having its pneumatic portion thoroughly protected from the danger of puncture directly through the tread thereof. After assembling the said parts the tire is attached to the rim D of any suitable wheel and inflated in a manner common to all pneumatic tires.

I do not confine myself to the specific details of construction as herein described and shown, as I believe that under the scope of my invention I am entitled to make slight modifications.

Having thus described my invention, what I claim as new, and desire to secure by Letters Patent, is—

The combination of a pneumatic tube having a thickened outer surface with an annular groove therein; with a fabric-covered spring-metal ring and a flexible tread having annular grooves therein and notches or openings through the walls separating said grooves, and cross-corrugations upon its outer surface, the said parts being cemented to each other within the groove of the pneumatic tube, substantially as shown and described.

In testimony that I claim the foregoing as my invention I have signed my name, in presence of two witnesses, this 15th day of January, 1896.

RICHARD PATTISON.

Witnesses:
M. MacLean,
B. McComb.